United States Patent [19]

Ellingen et al.

[11] 4,184,886
[45] Jan. 22, 1980

[54] METHOD OF CONDITIONING HOT GASES FOR FILTRATION

[75] Inventors: Karl Ellingen; Wolfgang Gaumert, both of Cologne, Fed. Rep. of Germany

[73] Assignee: Klöckner-Humboldt-Deutz AG, Fed. Rep. of Germany

[21] Appl. No.: 909,675

[22] Filed: May 25, 1978

[30] Foreign Application Priority Data

May 28, 1977 [DE] Fed. Rep. of Germany ....... 2724372

[51] Int. Cl.² ................................................ C04B 7/44
[52] U.S. Cl. ..................................... 106/100; 55/8
[58] Field of Search ............... 106/100; 423/215; 55/8, 55/10

[56] References Cited

U.S. PATENT DOCUMENTS

| 3,451,665 | 6/1919  | Strassen        | 106/100 |
| 3,485,012 | 12/1969 | Deussner        | 55/8    |
| 3,784,389 | 6/1974  | Hastrup         | 106/100 |
| 3,923,536 | 2/1975  | Kobayashi et al.| 106/100 |
| 4,001,031 | 1/1977  | McCord et al.   | 106/100 |
| 4,093,426 | 6/1978  | Benjumea        | 55/8    |
| 4,126,471 | 11/1978 | Herchenbach et al. | 106/100 |

Primary Examiner—G. O. Peters
Attorney, Agent, or Firm—Hill, Van Santen, Steadman, Chiara & Simpson

[57] ABSTRACT

Hot dust laden gases from heated kilns in cement plants are mixed with a cooler moistening medium to provide a mixture having a dew point lying within a temperature range in which dust separation in electrofilters is greatly enhanced. Volatile alkali compounds in the gases condense on the dust particles and are substantially completely filtered out of the gases before discharge of the gases to the atmosphere. The electrical resistance of the dust in the gas is reduced by the moisture from high levels of about $10^{15}$ [ohm×cm] to levels below about $10^{11}$ [ohm×cm] so that efficient dust precipitation in electrofilters can be effected at low temperatures of about 150° C. and at the same time removal of alkali from the cement clinker is enhanced.

14 Claims, 1 Drawing Figure

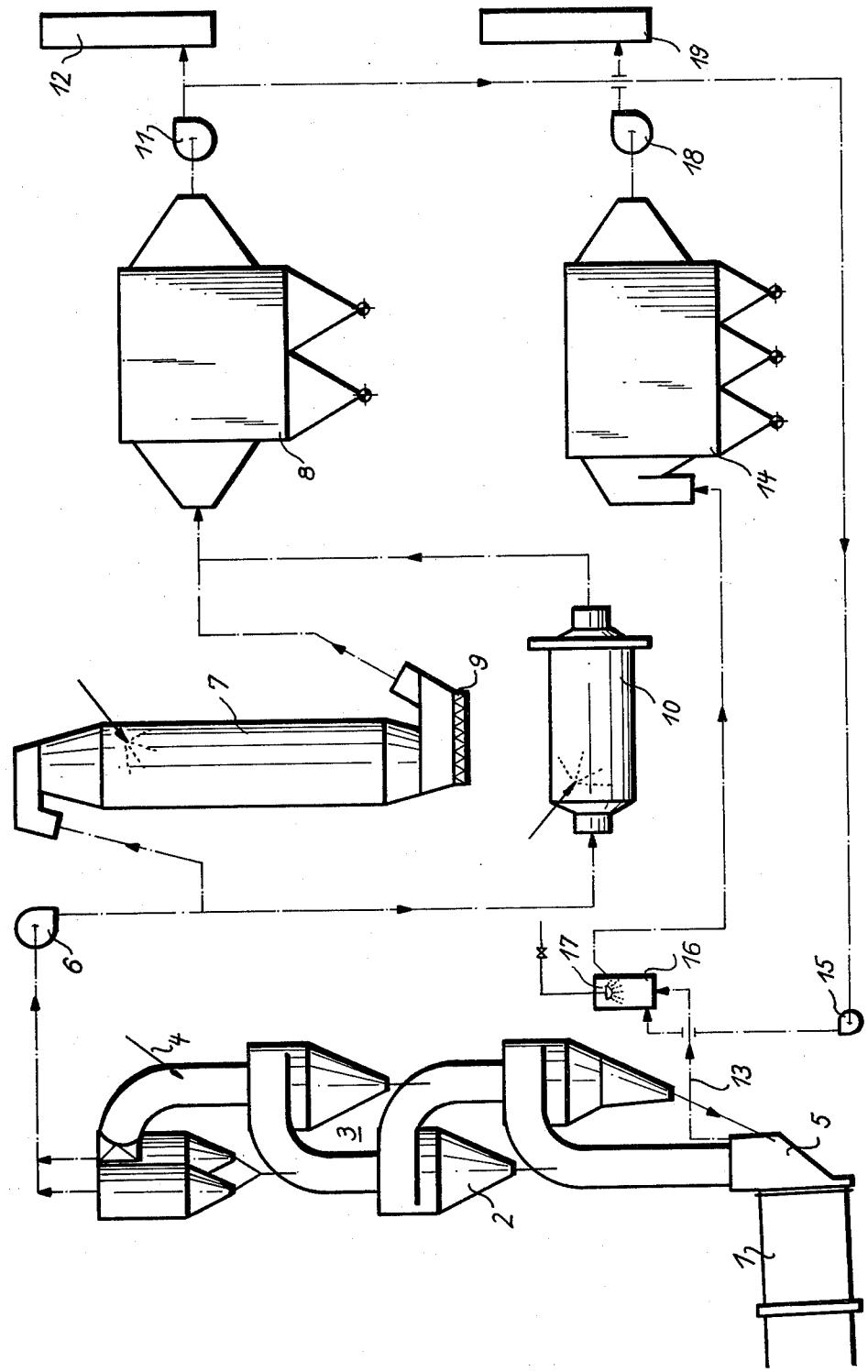

METHOD OF CONDITIONING HOT GASES FOR FILTRATION

FIELD OF THE INVENTION

This invention relates to the conditioning of hot dust laden gases, especially in cement plants, to increase the effectiveness of filters, especially electrofilters, in separating the dust from the gases. Specifically, the invention deals with the conditioning of hot exhaust gases from cement kilns with a cooler medium having a higher dew point temperature than the bypass gases for condensing alkali on dust particles in the bypass gases and separating the particles from the gases prior to filtration.

This invention will hereinafter be specifically described in connection with the conditioning of alkali containing gases from cement kilns for treatment in electrofilters to enhance the separation of dust laden pollutants from the gases.

Utilization of certain raw materials for making cement produces alkali combinations which must be removed from the cement so that upon storage alkali carbonates will not be formed to alter the setting time of the cement.

A further alkali-problem results in cement calcining technique through high circulation of alkali causing adhesions in the furnace system and changes in flow characteristics of the comminuted raw material.

While it has been proposed to branch off approximately a 10% partial stream out of the alkali-containing main exhaust gas stream from the calcining furnace and to cool off this partial stream from temperatures of about 1100° C. by means of cooling air, this treatment involves appreciable heat loss and is not satisfactory.

According to this invention, gases of about 1100° C. from the kiln are first cooled to approximately 480° C. by countercurrent flow of the gases and raw cement making materials being fed to the kiln. Then, some of the gases are mixed with a high dew point cooler gaseous medium and alkali content vapors are condensed on entrained dust particles which separate from the gases so that it may be efficiently filtered.

It is then an object of this invention to condition exhaust gases from cement plants for enhancing filtration of dust particles from the gases by treating the gases prior to filtration with a cooling medium having a higher dew point than the gases effecting a condensation of alkali vapors on dust particles.

Another object of the invention is to bypass a portion of hot gases from a cement kiln flowing in coutercurrent relation to the feeding of raw cement material to the kiln and to treat the bypass gases with a media at a lower temperature than the gases and having a higher dew point than the gases to create dust particles of a size which can be easily filtered.

A specific object of this invention is to precondition dust laden exhaust gases from a cement plant prior to filtration by admixing the gases with water at a lower temperature which cools the gases and raises the dew point of the gases prior to filtration.

A specific object of the invention is to reduce the dust content of exhaust gases in a cement plant having a heated rotary drying kiln fed from a series of cyclone separators with pulverized cement material in countercurrent flow relation with hot gases from the kiln where the hot gases from the last cyclone separator are partially bypassed through a vaporization cooler which reduces the temperature of the gases and raises the dew point of the gases prior to filtration.

Another object of the invention is to furnish a method for the removal of dust particularly from furnace by-passed gases enriched with alkali in a cement plant with which it is possible to attain a low dust content exhaust gas which will not pollute the environment.

A still further object of the invention is to provide optimal separation conditions for electrofilters providing for dust removal of dust laden gases in a cement plant.

Another and specific object of the invention is to admix a cooler gaseous medium with gases bypassed from a cement kiln prior to feeding the gases to an electrofilter and selecting a medium which has a higher dew point temperature than the bypassed gases.

The objects of this invention are attained by providing a gas mixture from the bypassed gases having a dew point lying in a temperature range in which dust separation from filters such as electrofilters is enhanced. This increases the efficiency of the operation, reduces the dust content of the exhaust gases and makes possible the use of smaller electrofilters.

The mixing of the cooler gaseous medium with the bypass gases effects a condensation of volatile alkali compounds from the gases onto the dust particles so that these may be filtered out of the gases providing a gas that can be discharged without polluting the atmosphere and also making possible a lowering of the alkali content of the cement clinker being formed. The kiln operation of the cement forming process is improved because the volatility of the alkalis developed in forming the cement clinker may be increased by means of additives such as chlorine without the dangers of subliming alkali compound particles in the bypass gas discharged to the atmosphere.

In development of the invention, it is provided that the admixture-gases have a dew point temperature of 30° to 70° C., preferably of 45° to 55° C. In this way, it is possible to improve particularly economically the critical resistance values of the dust for an electrofiltration. It is suitable in this connection that the already conditioned installation-exhaust-gases are utilized at least partially as admixture-gas. The advantage of this measure lies therein, that the additive gases raising the dew point may be utilized out of the installation itself for the cooling and conditioning of the bypass gases, and that the temperature and the moisture of these already conditioned installation-exhaust-gases may be so adjusted that the mixture-gases with reference to optimal specific dust-resistant-values, lie in the area of optimum values.

In a preferred embodiment of the invention, it is provided that in the case of cement installations with partial utilization of the installation-exhaust-gases for the dry-grinding of the raw materials, the exhaust gases from the pulverization are utilized at least partially as admixture-gas. This advantage becomes particularly noticeable in the case of the dust removal of long dry-rotary-furnaces, which without heat-exchangers treat or process alkali-rich raw material in regions low in fresh water. Here, instead of cold air, exhaust gas of the tube mill which according to a further embodiment of the method according to the invention, would advantageously be purified by means of electrofilters, is used for the cooling and conditioning of the alkali-containing exhaust gases. Indeed, the mixing chamber for exhaust gas and additive gas must be dimensioned somewhat larger, still through the raising of the dew point and the improvement of the dust-separation-conditions connected therewith, the electrofilter becomes appreciably smaller in its dimensions and with greater reliability, a lower dust content in the pure gas is attained. In case the alkali-containing filter-dust is displaced without residue, according to a further embodiment of the invention, it is also possible through injection of saltwater into the mixing chamber to improve the separation conditions still further.

In a particular embodiment of the invention, it is provided that the conditioned furnace exhaust gas and/or bypass gas is purified and/or freed from dust and subsequently supplied for the raw material drying and/or the dry-grinding of the raw material to be used in the manufacture of cement. In this manner, the already conditioned furnace exhaust gases contribute not only to a better separating effect of the dust portion in most alkali-containing bypass gases, but there is additionally attained an appreciable recovery of heat through the utilization of the purified bypass gases for the drying of raw material.

BRIEF DESCRIPTION OF THE DRAWINGS

The installation for the production of cement shown consists of a short dry-rotary kiln 1, with which is connected in series a suspension-gas-heat-exchanger 3 consisting of four cyclones 2, in which heat exchanger there is delivered then at 4 the pulverized raw material to be used in the manufacture of cement, to be treated thermally. The pulverized raw material to be used in the manufacture of cement is supplied,—in countercurrent to the hot gases from the rotary kiln 1—passes through the cyclones 2 of the suspension-gas-heat-exchanger 3 from the top downwardly and in the lowermost cyclone is separated from the hot stream of gas and introduced into the furnace-inlet-head 5 of the rotary kiln 1 for the further treatment in the rotary kiln itself.

The 350–400° C. hot dust-laden exhaust gases of the heat exchanger are conveyed out of its uppermost cyclone through a suction-blower 6 into a vaporization cooler 7 for the gas conditioning. In this evaporation cooler, a predetermined quantity of water referred to the volume of gas to be cooled is injected, said quantity of water resulting from the beginning and end temperature of the gas and the gas moisture. In this way, the exhaust gases hot to 350° to 400° C. are lowered to a temperature of approximately 180° to 100° C. At the same time, the dew point of the gases is raised through the evaporation of the additionally injected water, and the gas-dust-mixture so conditioned, that the electrical resistance of the dust is reduced from the high levels of dry dust in cement plant exhaust gases of about $10^{15}$[ohm×cm] to lie below a critical dust electrical resistance of $10^{11}$[ohm×cm].

If the dusts of the pulverized raw material to be separated out have attained an electrical resistance of $10^{11}$[ohm×cm], then an operating temperature of about 150° C. in the electrofilter is sufficient to lower the dust contents to levels of 100 mg/Nm$^3$ (weight and size of dust in a cubic meter of gas) for the electrofilter to be connected in series with the evaporation cooler 7, and satisfy legislated air pollution standards.

As the evaporation cooler 7 is flowed through in direct current by the dust-containing gas from above downwardly together with the injected water, at whose lower end the gas is deflected and conveyed to the electrofilter, the dust drops out in a quantity of about 10 to 20% of the total dust content, referred to the gas entry, and collects on the lower part of the evaporation cooler, where it is conveyed off by means of a worm conveyor 9.

A part of the hot exhaust gases conveyed out of the heat exchanger 3 by the blower 6 are supplied while avoiding the evaporation cooler 7 to a dry grinding device, preferably a tube mill 10. It is necessary with technical and chemical grinding, to limit the temperatures within the grinding process in the tube mill among others through injection of water. Under consideration of determined operating conditions, the quantity of water to be injected into the tube mill is adapted to the temperature of the clinker to be ground, the fine quality of the grinding, etc. The raising of the dew point of the exhaust gases from the grinding again makes possible its optimal separation in the electrofilter 8. Following the gas removal in the electrofilter 8, the exhaust gases are conveyed from a blower 11, to an installation 12 not shown in greater detail for the drying of the material.

Upon the utilization of predetermined alkali-containing raw materials, there occur in the calcination process alkali-compounds, which lead to changes in the cement produced or to formations of large deposits and circulation phenomena, respectively, in the rotary-kiln heat-exchange system. These alkali-compounds disturbing in the calcination process are removed by means of a partial gas suction through a bypass conduit 13 out of the furnace system.

As these bypass gases were previously either discarded directly or permitted of being only insufficiently freed from dust in a dust removal system with cooling of the bypass gases through cold surrounding air or water injection, now there is admixed with the bypass gases before entry into an electrofilter 14 provided separately for the dust removal from the bypass gases,—as cooling gaseous medium, at least a partial quantity of the purified furnace exhaust gases already conditioned in the evaporation cooler 7 and purified in the electrofilter 8, which have a dew point temperature of approximately 45° to 55° C. at a gas temperature of 90° to 100° C.

These admixture gases are intensively mixed via a blower 15 with the hot alkali-containing bypass gases out of the rotary kiln 1 in a mixing chamber 16 through twisting guidance of the gases, indeed so intensively that under considertion of the particular portions of gas quantity at the outlet of the mixing chamber, a mixture-gas-temperature of about 480° and therebelow is employed. Additionally there takes place through an injection device 17 an injection of water of about 15 g/Nm$^3$ into the mixing chamber 16, in order to attain the gas temperature of approximately 380° C. required for the optimal operating temperature of an electrofilter. The dew point of the gas mixture withdrawn from the mixing chamber is adjusted then to something above 50° C., so that in the electrofilter 14 connected in series with the mixing chamber 16, optimal separating conditions prevail for the cement dust and the alkalies sublimed in the mixing chamber to the finest dusts. The bypass gases withdrawn from the electrofilter 14 through a blower 18 and purified may subsequently be utilized in the raw material drying 19, so that hereby an appreciable additional heat recovery permits of being attained for the entire system.

The invention is not limited solely to the embodiment shown by way of example, but according to this method the dust removal from long dry rotary kilns may be carried out to advantage without heat exchanger, whereby the alkali-containing exhaust gases in the case of the treatment of alkali-rich raw material may be cooled instead of with cold air from the surroundings, with the exhaust gases of the tube mill, which was already purified by an electrofilter. The gas mixture produced is conditioned with respect to temperature and dew point so optimally, that also here in an electrofilter of small dimensions, reliably low dust contents of purified gas may be attained.

We claim as our invention:

1. The method of reducing the dust and alkali content of exhaust gases in a cement plant having a heated drying kiln fed from a series of cyclone separators with pulverized raw cement making material in counter current flow relation with hot gases from the kiln and electrofilters for filtering the dust and alkali laden hot gases which comprises passing some of the gases from the first cyclone separator through a vaporization cooler, introducing a medium into the cooler having a lower temperature and a higher dew point temperature than said gases, reducing the temperature and raising the dew point of said gases in the cooler, condensing alkali vapors from said gases on dust particles in the gases, separating the alkali coated dust from the cooled gases at the bottom of the cooler, passing some of the gases from the first cyclone separator through a grinding mill, comminuting solid particles entrained in said gases in the grinding mill, feeding the gases from the bottom of the vaporization cooler and the grinding mill to an electrofilter, drying filtered gases from the electrofilter, feeding filtered gases to a mixing chamber, feeding hot gases from the kiln to the mixing chamber, injecting water into the mixing chamber, reducing the temperature and raising the dew point of the gases in the mixing chamber, feeding the mixed gases from the mixing chamber to another electrofilter, heating raw cement making material with the purified mixed exhaust gases from the other electrofilter, and discharging the purified gases.

2. The method of reducing the alkali and dust content of exhaust gases from cement plants havng a heated drying kiln fed from a series of cyclone separators with pulverized raw cement making material in countercurrent flow relation with hot gases from the kiln and filter means for filtering the dust laden hot gases which comprises bypassing some of the hot gases from the first cyclone separator, mixing the bypassed gases with a cooler medium having a higher dew point temperature than the bypass gases, cooling the bypass gases and raising the dew point thereof, condensing alkali vapors on dust particles in the bypass gases, separating the dust particles from the bypass gases, passing some of the gases from the first cyclone separator through a grinding mill, comminuting solid particles entrained in said gases in the grinding mill, and feeding the bypass gases and the gases from the grinding mill through the filter means.

3. The method of conditioning exhaust gases in a cement plant having a calcining kiln and dust filter means which comprises bypassing exhaust gases from the kiln before entry into the filter means, admixing the bypass gases with a gaseous medium having a lower temperature and a higher dew point than said gases, reducing the temperature and raising the dew point of the bypass gases, separating dust particles from the cooled mixed gases, passing the cooled mixed gases through the filter means, feeding filtered gases to a mixing chamber, feeding hot gases from the kiln to the mixing chamber, reducing the temperature and raising the dew point of the gases in the mixing chamber, and filtering the mixed gases from the mixing chamber.

4. The method of claim 1 wherein the gases are reduced to a dew point temperature of 30° to 70° in the vaporization cooler.

5. The method of claim 1 wherein the exhaust gases from the first cyclone have a temperature of 350° to 400° C. and the gases passed to the vaporization cooler are cooled to temperatures of 180 to 100° C.

6. The method of claim 2 wherein the cooler medium is cold air.

7. The method of claim 2 wherein the cooler medium is water vapor.

8. The method of claim 2 including the added step of feeding gases direct from the kiln to a mixing chamber, and lowering the temperature and raising the dew point of the gases in the mixing chamber.

9. The method of claim 2 including the step of increasing the alkali content of the gases by adding chlorine compounds to the kiln.

10. The method of claim 3 wherein the gaseous medium is water vapor.

11. The method of claim 3 wherein the gases have fine dust particles with an electrical resistance in the order of $10^{15}$(ohm×cm), the gaseous medium reduces this resistance to at least $10^{11}$(ohm×cm), and the cooled mixed gases are fed through an electrofilter to precipitate the dust.

12. The method of claim 11 wherein the temperature of the cooled mixed gas passing through the electrofilter is in the range of 100° to 180° C.

13. The method of claim 11 wherein the precipitation is continued until gases containing not more than 100 mg of dust per cubic meter are discharged.

14. The method of claim 3 wherein the mixed gases have a dew point temperature of from 30° to 70° C.

* * * * *